United States Patent
Huang et al.

(10) Patent No.: US 11,959,020 B2
(45) Date of Patent: Apr. 16, 2024

(54) ACIDIZING RETARDER COMPOSITIONS AND METHODS OF REDUCING A RATE OF CARBONATE DISSOLUTION USING THE SAME

(71) Applicant: Saudi Arabian Oil Company, Dhahran (SA)

(72) Inventors: Jin Huang, Dhahran (SA); Wengang Li, Dhahran (SA); Bader Ghazi Al-Harbi, Dhahran (SA); Ayman M. Almohsin, Kobar (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/565,587

(22) Filed: Dec. 30, 2021

(65) Prior Publication Data

US 2023/0212452 A1 Jul. 6, 2023

(51) Int. Cl.
*E21B 43/27* (2006.01)
*C09K 8/54* (2006.01)
*C09K 8/74* (2006.01)
*E21B 41/02* (2006.01)

(52) U.S. Cl.
CPC ............. *C09K 8/74* (2013.01); *C09K 8/54* (2013.01); *E21B 41/02* (2013.01); *E21B 43/27* (2020.05); *C09K 2208/32* (2013.01)

(58) Field of Classification Search
CPC ........ C09K 8/54; C09K 2208/32; C09K 8/74; E21B 43/27
See application file for complete search history.

(56) References Cited

U.S. PATENT DOCUMENTS

| | | | | |
|---|---|---|---|---|
| 10,604,694 B1* | 3/2020 | Berger | ............ | C09K 8/28 |
| 2012/0087993 A1* | 4/2012 | Martin | ............ | A01N 35/04 |
| | | | | 424/661 |
| 2016/0264833 A1* | 9/2016 | Stone | ............ | C09K 8/035 |
| 2019/0367799 A1* | 12/2019 | Gupta | ............ | C09K 8/54 |
| 2019/0390104 A1* | 12/2019 | Sultan | ............ | C09K 8/70 |
| 2020/0063017 A1* | 2/2020 | Todd | ............ | E21B 37/06 |
| 2021/0246363 A1* | 8/2021 | Al-Jawad | ............ | C09K 8/94 |

OTHER PUBLICATIONS

Amro et al., "Extended Matrix Acidizing Using Polymer-Acid Solutions", Society of Petroleum Engineers, SPE 106360, 2006.
Jansen et al., "Controlled release of morphine from a poloxamer 407 gel", International Journal of Pharmaceutics, vol. 452, pp. 266-269, 2013.
Sokhanvarian et al., "Experimental Evaluation of a New Nonaromatic Nonionic Surfactant for Deep Carbonate Stimulation", Society of Petroleum Engineers, Drilling & Completion, SPE 193596, 2021.

\* cited by examiner

*Primary Examiner* — Silvana C Runyan
(74) *Attorney, Agent, or Firm* — DINSMORE & SHOHL LLP

(57) ABSTRACT

This disclosure relates to acidizing retarder compositions and methods of reducing the rate of carbonate dissolution in carbonate acidizing treatments of carbonate formations using the acidizing retarder compositions. The methods may include dissolving one or more retarder compounds in a solution comprising a strong acid to form acidizing retarder compositions, and introducing the acidizing retarder compositions to carbonate formations. The acidizing retarder compositions may include one or more retarder compounds and a strong acid. At least one of the one or more retarder compounds may be a poloxamer. A concentration of the strong acid in the acidizing retarder composition may be 5 weight percent or greater.

18 Claims, No Drawings ated retarder compositions. In one or more embodiments, an acidizing retarder composition comprising a retarder compound and a strong acid may be combined with carbonate, which may significantly reduce the dissolution rate of carbonate, improve the acid stimulation efficiency, and reduce the amount of acid required for stimulation, therefore optimizing the economics of hydrocarbon extraction.

ACIDIZING RETARDER COMPOSITIONS AND METHODS OF REDUCING A RATE OF CARBONATE DISSOLUTION USING THE SAME

FIELD

Embodiments disclosed herein generally relate to acidizing retarder compositions and treating a subterranean formation to increase hydrocarbon production.

TECHNICAL BACKGROUND

Acid stimulation is a cost effective, chemical-based well stimulation treatment method that may be used to create wormholes or conductive fractures in a subterranean formation, enhancing hydrocarbon production from the subterranean formation. Among common acids, hydrochloric acid (HCl) is widely used in acidizing treatments due to its high dissolving power, high availability, and low cost. However, a reaction between strong acids, such as HCl, and the subterranean formation may result in premature acid consumption and depletion near the surface of the subterranean formation, leading to inefficient stimulation.

SUMMARY

Acidizing retarder compositions may reduce the reactivity of the acid when compared to conventional acid treatments. Such reduced reactivity allows subsequent portions of the acid treatments to be diverted away from areas of the subterranean formation that have already been treated and allows for deeper and more complete treatment of the formation. Consequently, the reduced acid reactivity may allow for deeper penetration and increased conductivity throughout the length of wormholes and fractures, which may be induced during the treatment. Thus, compositions and methods to reduce the reaction rate between acids and subterranean formations, while maintaining the acidizing capability of strong acids is highly desired.

These needs are met by the embodiments disclosed herein. One or more embodiments disclosed herein provide a method of reducing a rate of carbonate dissolution in a carbonate acidizing treatment of a carbonate formation comprising dissolving one or more retarder compounds in a solution comprising a strong acid to form an acidizing retarder composition and introducing the acidizing retarder composition to the carbonate formation, wherein at least one of the one or more retarder compounds comprises a poloxamer.

According to aspects, an acidizing retarder composition comprises one or more retarder compounds and a strong acid, wherein at least one of the one or more retarder compounds is a poloxamer, and wherein a concentration of the strong acid in the acidizing retarder composition is 5 weight percent or greater.

This summary is provided to introduce a selection of concepts that are further described in the detailed description. This summary is not intended to identify key or essential features of the claimed subject matter, nor is it intended to be used as an aid in limiting the scope of the claimed subject matter.

Additional features and advantages of the described embodiments will be set forth in the detailed description that follows. The additional features and advantages of the described embodiments will be, in part, readily apparent to those skilled in the art from that description or recognized by practicing the described embodiments, including the detailed description that follows as well as the drawings and the claims.

DETAILED DESCRIPTION

Reference will now be made in detail to embodiments of acidizing retarder compositions and methods for treating a subterranean formation with acidizing retarder compositions.

Embodiments disclosed herein include acidizing retarder compositions and methods of using. More specifically, some embodiments disclosed herein are directed toward acidizing retarder compositions, and methods of reducing a rate of carbonate dissolution in a carbonate acidizing treatment of a carbonate formation using said acidizing carbon- In one or more embodiments, an acidizing retarder composition includes one or more retarder compounds and a strong acid. In one or more embodiments, at least one of the one or more retarder compounds may comprise a poloxamer. In one or more embodiments, a concentration of the strong acid in the acidizing retarder composition may be 5 weight percent or greater.

In one or more embodiments, a method of reducing a rate of carbonate dissolution in a carbonate acidizing treatment of a carbonate formation includes dissolving one or more retarder compounds in a solution comprising a strong acid to form an acidizing retarder composition and introducing the acidizing retarder composition to the carbonate formation. In one or more embodiments, at least one of the one or more retarder compounds may comprise a poloxamer.

As used throughout this disclosure, the term "carbonate acidizing treatment" refers to the treatment of a subterranean formation with a stimulation fluid containing a reactive acid. In carbonate formations, the acid dissolves the entire formation matrix. The carbonate acidizing treatment improves the formation permeability to enable enhanced production of reservoir fluids. Carbonate acidizing operations are ideally performed at pressures below the fracture pressure of the formation. This enables the acid to penetrate the formation and extend the depth of treatment while avoiding damage to the reservoir formation.

As used throughout this disclosure, the term "carbonate" refers to a class of sedimentary rock that comprises 95% or more by weight calcite ($CaCO_3$), aragonite (also $CaCO_3$), and dolomite ($CaMg(CO_3)_2$). Dolomite is a mineral that can replace calcite during the process of dolomitization. Limestone, dolostone or dolomite, and chalk are carbonate rocks. Carbonate rocks can serve as hydrocarbon reservoir rocks, particularly if their porosity has been enhanced through dissolution. Wormholes and fractures augment permeability of subterranean formations to allow for flow and extraction of hydrocarbon reservoirs trapped within the reservoir rocks.

As used throughout this disclosure, the term "formation matrix" refers to the finer grained, interstitial particles that lie between larger particles or in which larger particles are embedded in sedimentary rocks such as sandstones and conglomerates.

As used throughout this disclosure, the term "reservoir" refers to a subsurface formation having sufficient porosity and permeability to store and transmit fluids.

As used throughout this disclosure, the term "subterranean formation" refers to a body of rock that is sufficiently distinctive and continuous from the surrounding rock bodies such that the body of rock can be mapped as a distinct entity. A subterranean formation is, therefore, sufficiently homogenous to form a single identifiable unit containing similar properties throughout the subterranean formation, including, but not limited to, porosity and permeability. A subterranean formation is the fundamental unit of lithostratigraphy.

As used throughout this disclosure, the term "wellbore" refers to the drilled hole or borehole, including the openhole or uncased portion of the well. Borehole may refer to the inside diameter of the wellbore wall or the rock face that bounds the drilled hole.

As used herein, the term "retarder compound" may refer to a chemical compound, mixture, or composition operable to reduce a rate of a reaction. An acidizing retarder composition may be operable to reduce the rate at which an acid dissolves a material, such as a carbonate formation.

As used herein, the term "acidizing retarder composition" may refer to a composition operable to dissolve carbonate by reacting an acid with the carbonate in a reaction in the presence of an additive, where the reaction proceeds at a rate slower than a composition in the absence of the additive.

As used herein, the term "strong acid" may refer to an acid solution with a pH from 0 to 3. For example, strong acids include, but are not limited to, hydrochloric acid, nitric acid, sulfuric acid, hydrobromic acid, hydroiodic acid, triflic acid, perchloric acid, or a combination of two or more thereof. The strong acid may include mineral acids, organic acids, or combinations thereof.

As used herein, the term "fluid" may include liquids, gases, or both.

As used throughout this disclosure, the term "production tubing" refers to a wellbore tubular used to produce reservoir fluids. Production tubing is assembled with other completion components to make up the production string. The production tubing selected for any production string should be compatible with the wellbore geometry, reservoir production characteristics, and the reservoir fluids.

As used throughout this disclosure, the term "coiled tubing" refers to a long, continuous length of pipe wound on a spool. The pipe is straightened prior to pushing into a wellbore and rewound to coil the pipe back onto the transport and storage spool. It will be appreciated that coiled tubing may be 5,000 meters (m) or greater in length. Coiled tubing may be provided as a secondary and separated conduit through the wellbore and may be passed within the annulus of the production tubing.

In one or more embodiments, the acidizing retarder composition comprises one or more retarder compounds. In one or more embodiments, at least one of the one or more retarder compounds is a poloxamer. As used herein, the term "poloxamer" may refer to a triblock copolymer comprising a central hydrophobic chain of poly(propylene oxide) and two hydrophilic chains of poly(ethylene oxide).

In one or more embodiments, the poloxamer may comprise a structure of formula (I):

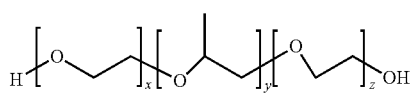

(I)

in which x, y, and z are each independently an integer that indicate a number of repeat units present in the compound. Without being bound by any particular theory, it is believed that the triblock structure comprising the central hydrophobic chain and two hydrophilic chains of the poloxamer may result in a water soluble compound that may be dissolved in an acid solution to form the acidizing retarder composition.

In one or more embodiments, x and z each may independently be an integer from 50 to 150, For instance, in one or more embodiments, x and z each may independently be an integer from 50 to 100, from 55 to 100, from 60 to 100, from 65 to 100, from 70 to 100, from 75 to 100, from 80 to 100, from 85 to 100, from 90 to 100, from 95 to 100, from 50 to 105, from 55 to 105, from 60 to 105, from 55 to 105, from 70 to 105, from 75 to 105, from 80 to 105, from 85 to 105, from 90 to 105, from 95 to 105, from 50 to 110, from 55 to 110, from 60 to 110, from 65 to 110, from 70 to 110, from 75 to 110, from 80 to 110, from 85 to 110, from 90 to 110, from 95 to 110, from 50 to 120, from 55 to 120, from 60 to 120, from 65 to 120, from 70 to 120, from 75 to 120, from 80 to 120, from 85 to 120, from 90 to 120, from 95 to 120, from 50 to 130, from 55 to 130, from 60 to 130, from 65 to 130, from 70 to 130, from 75 to 130, from 80 to 130, from 85 to 130, from 90 to 130, from 95 to 130, from 50 to 140, from 55 to 140, from 60 to 140, from 65 to 140, from 70 to 140, from 75 to 140, from 80 to 140, from 85 to 140, from 90 to 140, from 95 to 140, from 50 to 150, from 55 to 150, from 60 to 150, from 65 to 150, from 70 to 150, from 75 to 150, from 80 to 150, from 85 to 150, from 90 to 150, from 95 to 150, from 98 to 102, or from 100 to 102.

In one or more embodiments, y may be an integer from 20 to 80. For instance, in one or more embodiments, y may be an integer from 20 to 80, from 25 to 80, from 30 to 80, from 35 to 80, from 40 to 80, from 45 to 80, from 50 to 80, from 55 to 80, from 20 to 70, from 25 to 70, from 30 to 70, from 35 to 70, from 40 to 70, from 45 to 70, from 50 to 70, from 55 to 70, from 20 to 60, from 25 to 60, from 30 to 60, from 35 to 60, from 40 to 60, from 45 to 60, from 50 to 60, or from 55 to 60.

In one or more embodiments, the poloxamer may comprise Poloxamer 407, a triblock copolymer comprising a central hydrophobic block of polypropylene glycol with an average block length of 56 repeat units positioned between two hydrophilic blocks of polyethylene glycol, wherein each of the two hydrophilic blocks of polyethylene glycol have an average block length of 101 repeat units. An exemplary compound comprising Poloxamer 407 is Pluronic™ F-127, a commercially available material from BASF.

In one or more embodiments, the acidizing retarder composition may comprise from 0.01 weight percent (wt. %) to 5 wt. % of the one or more retarder compounds based on the total weight of the acidizing retarder composition. For instance, the acidizing retarder composition may comprise from 0.01 wt. % to 0.1 wt. %, from 0.01 wt. % to 0.5 wt. %, from 0.1 wt. % to 0.5 wt. %, from 0.01 wt. % to 1 wt. %, from 0.1 wt. % to 1.0 wt. %, from 0.5 wt. % to 1 wt. %, from 0.01 wt. % to 2 wt. %, from 0.1 wt. % to 2 wt. %, from 0.5 wt. % to 2 wt. %, from 1 wt. % to 2 wt. %, from 0.01 wt. % to 3 wt. %, from 0.1 wt. % to 3 wt. %, from 0.5 wt. % to 3 wt. %, from 1 wt. % to 3 wt. %, from 2 wt. % to 3 wt. %, from 0.01 wt. % to 4 wt. %, from 0.1 wt. % to 4 wt. %, from 0.5 wt. % to 4 wt. %, from 1 wt. % to 4 wt. %, from 2 wt. % to 4 wt. %, from 3 wt. % to 4 wt. %, from 0.01 wt. % to 5 wt. %, from 0.1 wt. % to 5 wt. %, from 0.5 wt. % to 5 wt. %, from 1 wt. % to 5 wt. %, from 2 wt. % to 5 wt. %, from 3 wt. % to 5 wt. %, or from 4 wt. % to 5 wt. % of the one or more retarder compounds based on the total weight of the acidizing retarder composition. Without intending to be bound by any particular theory, it is believed that a concentration of the one or more retarder compounds below 0.01 wt. % may result in insufficient reduction of the carbonate dissolution rate. Further, it is believed that a concentration of the one or more retarder compounds greater than 5 wt. % may result in gelation of the acidizing retarder composition, which may reduce the production of wormholes, conductive fractures, or combinations thereof in the carbonate formation.

In one or more embodiments, the acidizing retarder composition may comprise a strong acid. In one or more embodiments, the strong acid is hydrochloric acid. In one or more embodiments, the strong acid may comprise hydrochloric acid. In one or more embodiments, the strong acid may comprise hydrochloric acid, nitric acid, sulfuric acid, hydrobromic acid, hydroiodic acid, triflic acid, perchloric acid, or a combination of two or more thereof. In one or more embodiments, the strong acid is selected from the group consisting of hydrochloric acid, nitric acid, sulfuric acid, hydrobromic acid, hydroiodic acid, triflic acid, perchloric acid, and a combination of two or more thereof. In one or more embodiments, the strong acid may comprise a mineral acid. In one or more embodiments, the strong acid may comprise an organic acid. In one or more embodiments, the strong acid may comprise a mineral acid and an organic acid.

In one or more embodiments, the acidizing retarder composition may comprise from 1 wt. % to 40 wt. % of strong acid based on the total weight of the acidizing retarder composition. For instance, the acidizing retarder composition may comprise from 1 wt. % to 5 wt. %, from 1 wt. % to 10 wt. %, from 1 wt. % to 15 wt. %, from 1 wt. % to 20 wt. %, from 1 wt. % to 25 wt. %, from 1 wt. % to 30 wt. %, from 1 wt. % to 35 wt. %, from 1 wt. % to 40 wt. %, from 5 wt. % to 10 wt. %, from 5 wt. % to 15 wt. %, from 5 wt. % to 20 wt. %, from 5 wt. % to 25 wt. %, from 5 wt. % to 30 wt. %, from 5 wt. % to 35 wt. %, from 5 wt. % to 40 wt. %, from 10 wt. % to 15 wt. %, from 10 wt. % to 20 wt. %, from 10 wt. % to 25 wt. %, from 10 wt. % to 30 wt. %, from 10 wt. % to 35 wt. %, from 10 wt. % to 40 wt. %, from 15 wt. % to 20 wt. %, from 15 wt. % to 25 wt. %, from 15 wt. % to 30 wt. %, from 15 wt. % to 35 wt. %, from 15 wt. % to 40 wt. %, from 20 wt. % to 25 wt. %, from 20 wt. % to 30 wt. %, from 20 wt. % to 35 wt. %, from 20 wt. % to 40 wt. %, from 25 wt. % to 30 wt. %, from 25 wt. % to 35 wt. %, from 25 wt. % to 40 wt. %, from 30 wt. % to 35 wt. %, from 30 wt. % to 40 wt. %, or from 35 wt. % to 40 wt. % of strong acid. Without being bound by any particular theory, it is believed that a higher concentration of strong acid in the acidizing retarder composition may result in a faster rate of carbonate dissolution. For instance, it is believed that a concentration of strong acid less than 1 wt. % may result in insufficient carbonate dissolution. Further, it is believed that a concentration of strong acid greater than 40 wt. % may result in premature carbonate dissolution that may occur near the surface of the carbonate formation, which may result in more shallow wormholes, conductive fractures, or combinations thereof. Additionally, a concentration of strong acid greater than 40 wt. % may increase the corrosion rate.

In one or more embodiments, the acidizing retarder composition may comprise 5 wt. % or greater of the strong acid based on the total weight of the acidizing retarder composition. For instance, the acidizing retarder composition may comprise 5 wt. % or greater, 6 wt. % or greater, 7 wt. % or greater, 8 wt. % or greater, 9 wt. % or greater, 10 wt. % or greater, 11 wt. % or greater, 12 wt. % or greater, 13 wt. % or greater, 14 wt. % or greater, or 15 wt. % or greater of the strong acid.

In one or more embodiments, the acidizing retarder composition may comprise one or more corrosion inhibitors. As used herein, the term "corrosion inhibitor" may refer to chemical compound, material, or mixture that, when added to a fluid, decreases the corrosion rate of material that comes into contact with the fluid. In one or more embodiments, the acidizing retarder composition may comprise from 0.01 wt. % to 5 wt. % of corrosion inhibitors based on the total weight of the acidizing retarder composition. For instance, the acidizing retarder composition may comprise from 0.01 wt. % to 0.5 wt. %, 0.01 wt. % to 1 wt. %, from 0.01 wt. % to 2 wt. %, from 0.01 wt. % to 3 wt. %, from 0.01 wt. % to 4 wt. %, from 0.01 wt. % to 5 wt. %, from 0.5 wt. % to 1 wt. %, from 0.5 wt. % to 2 wt. %, from 0.5 wt. % to 3 wt. %, from 0.5 wt. % to 4 wt. %, from 0.5 wt. % to 5 wt. %, from 1 wt. % to 2 wt. %, from 1 wt. % to 3 wt. %, from 1 wt. % to 4 wt. %, or from 1 wt. % to 5 wt. % of corrosion inhibitors. Without intending to be bound by any particular theory, it is believed that a concentration of corrosion inhibitors below 0.01 wt. % may result in insufficient reduction of corrosion. Further, it is believed that a concentration of corrosion inhibitors greater than 5 wt. % may result in the plugging of porous media in the formation, which may cause formation damage. The maximum acceptable corrosion inhibitor concentration may be determined by corrosion tests and the formation damage tendency, which may be obtained by coreflooding experiments.

In one or more embodiments, the acidizing retarder composition may comprise one or more additives, including but not limited to solvents, foaming agents, gelling agents, iron control agents or $H_2S$ scavengers.

In acid stimulation treatments, the acid present in the acidizing retarder composition may react with minerals within the subterranean formation to improve the permeability and enable the enhanced production of fluids. In one or more embodiments, the acidizing retarder composition dissolves minerals within the subterranean formation to stimulate the subterranean formation and increase hydrocarbon production.

In subterranean formations that comprise carbonate, the acid may dissolve the entire formation matrix. As such, in some embodiments, the minerals dissolved within the subterranean formation may comprise calcite ($CaCO_3$). In other embodiments, the minerals dissolved within the subterranean formation may comprise dolomite ($CaMg(CO_3)_2$). In other embodiments, the minerals dissolved within the subterranean formation may comprise both calcite and dolomite.

In one or more embodiments, the acidizing retarder composition may be introduced into the subterranean formation. The acid present in the acidizing retarder composition may penetrate the formation and extend the depth of the carbonate acidizing treatment while avoiding damage to the formation.

In one or more embodiments, one or more retarder compounds may be dissolved in a solution comprising a strong acid to form an acidizing retarder composition. In one or more embodiments, at least one of the one or more retarder compounds may comprise a poloxamer.

In one or more embodiments, the acidizing retarder composition may be introduced to the carbonate formation. The acidizing retarder composition may be introduced to the carbonate formation through tubing, including but not limited to, coiled tubing, production tubing, bullheading, or combinations thereof. The acidizing retarder composition may be mixed in one or more batch mixers at the surface of the reservoir. The acidizing retarder composition may then be injected into the reservoir.

In one or more embodiments, the rate of carbonate dissolution in the presence of the acidizing retarder composition may be reduced by a range from 5% to 95%, relative to a rate of carbonate dissolution in the absence of the acidizing retarder composition. For instance, in some embodiments, the rate of carbonate dissolution in the presence of the acidizing retarder composition may be reduced by a range from 5% to 10%, from 5% to 25%, from 5% to 50%, from 5% to 75%, from 5% to 95%, from 25% to 50%, from 25% to 75%, from 25% to 95%, from 50% to 75%, from 50% to 95%, or from 75% to 95%. Without intending to be bound by any particular theory, it is believed that a reduction in the rate of carbonate dissolution may result in deeper acid penetration in a carbonate reservoir, which may increase hydrocarbon production.

In one or more embodiments, wormholes, conductive fractures, or combinations thereof may be formed in the carbonate formation. As used herein, "wormholes" may refer to an empty channel that may penetrate into the formation that form upon acid dissolution. As used herein, "conductive fractures" may refer to fractures formed when a stimulation fluid is injected at a pressure greater than the fracture pressure, which may result in the formation of fractures and a reaction between the acid and rock to keep the fracture conductive.

In one or more embodiments, the carbonate formation may be in a reservoir comprising hydrocarbons. In one or more embodiments, the hydrocarbons may be extracted from the reservoir.

Advantages of some embodiments disclosed herein may include, but are not limited to, improved acid stimulation, increased hydrocarbon production, and reduced acid volume required for acid stimulation.

According to an aspect, either alone or in combination with any other aspect, a method of reducing a rate of carbonate dissolution in a carbonate acidizing treatment of a carbonate formation comprises dissolving one or more retarder compounds in a solution comprising a strong acid to form an acidizing retarder composition and introducing the acidizing retarder composition to the carbonate formation. At least one of the one or more retarder compounds comprises a poloxamer.

According to a second aspect, either alone or in combination with any other aspect, the poloxamer comprises a compound of formula (I):

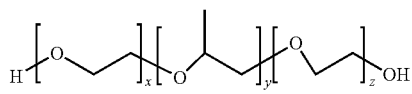

(I)

in which x and z are each independently an integer from 50 to 150, and in which y is an integer from 20 to 80.

According to a third aspect, either alone or in combination with any other aspect, x and z are each independently an integer from 95 to 105, and y is an integer from 50 to 60.

According to a fourth aspect, either alone or in combination with any other aspect, the strong acid comprises hydrochloric acid, nitric acid, sulfuric acid, hydrobromic acid, hydroiodic acid, triflic acid, perchloric acid, or a combination of two or more thereof.

According to a fifth aspect, either alone or in combination with any other aspect, the acidizing retarder composition comprises from 0.1 weight percent to 5 weight percent of the one or more retarder compounds based on the total weight of the acidizing retarder composition.

According to a sixth aspect, either alone or in combination with any other aspect, the acidizing retarder composition comprises from 5 weight percent to 30 weight percent of the strong acid based on the total weight of the acidizing retarder composition.

According to a seventh aspect, either alone or in combination with any other aspect, the acidizing retarder composition comprises greater than 5 weight percent of the strong acid based on the total weight of the acidizing retarder composition.

According to an eighth aspect, either alone or in combination with any other aspect, the acidizing retarder composition further comprises one or more corrosion inhibitors.

According to a ninth aspect, either alone or in combination with any other aspect, the acidizing retarder composition comprises from 0.01 weight percent to 5 weight percent of the one or more corrosion inhibitors based on the total weight of the acidizing retarder composition.

According to a tenth aspect, either alone or in combination with any other aspect, the method further comprises forming wormholes, conductive fractures, or combinations thereof, in the carbonate formation during the carbonate acidizing treatment.

According to an eleventh aspect, either alone or in combination with any other aspect, the carbonate formation is in a reservoir comprising hydrocarbons.

According to a twelfth aspect, either alone or in combination with any other aspect, the carbonate formation is in a reservoir comprising hydrocarbons, and the method further comprises extracting the hydrocarbons from the reservoir.

According to a thirteenth aspect, either alone or in combination with any other aspect, an acidizing retarder composition comprises one or more retarder compounds and a strong acid. At least one of the one or more retarder compounds is a poloxamer. A concentration of the strong acid in the acidizing retarder composition is 5 weight percent or greater.

According to a fourteenth aspect, either alone or in combination with any other aspect, the poloxamer comprises a compound of formula (I):

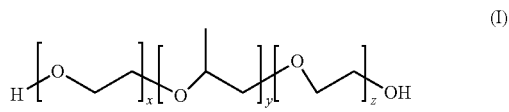

(I)

in which x and z are each independently an integer from 50 to 150, and in which y is an integer from 20 to 80.

According to a fifteenth aspect, either alone or in combination with any other aspect, x and z are each independently an integer from 95 to 105, and y is an integer from 50 to 60.

According to a sixteenth aspect, either alone or in combination with any other aspect, the strong acid comprises hydrochloric acid, nitric acid, sulfuric acid, hydrobromic acid, hydroiodic acid, triflic acid, perchloric acid, or a combination of two or more thereof.

According to a seventeenth aspect, either alone or in combination with any other aspect, the acidizing retarder composition comprises from 0.1 weight percent to 5 weight percent of the one or more retarder compounds based on the total weight of the acidizing retarder composition.

According to an eighteenth aspect, either alone or in combination with any other aspect, the acidizing retarder composition comprises from 5 weight percent to 30 weight percent of the strong acid based on the total weight of the acidizing retarder composition.

According to a nineteenth aspect, either alone or in combination with any other aspect, the acidizing retarder composition further comprises one or more corrosion inhibitors.

According to a twentieth aspect, either alone or in combination with any other aspect, the acidizing retarder composition comprises from 0.01 weight percent to 5 weight percent of the one or more corrosion inhibitors based on the total weight of the acidizing retarder composition.

EXAMPLES

The various embodiments disclosed herein will be further clarified by the following examples. The examples are illustrative in nature, and should not be understood to limit the embodiments disclosed herein. Acidizing retarder compositions are prepared and reacted with calcium carbonate discs to demonstrate a reduced rate of carbonate dissolution.

Example 1. Reduced Carbonate Dissolution Using Acidizing Retarder Compositions at 65° C.

Acidizing retarder compositions are prepared by dissolving a retarder compound in HCl according to Table 1, where the weight percent (wt. %) of HCl and the retarder compound is the wt. % of the prepared acidizing retarder composition before combining with the calcium carbonate disc and the balance is water. The retarder compound used in the Examples is Poloxamer 407, a triblock copolymer commercially available as Pluronic™ F-127 from BASF. Additionally, comparative Example 1 is prepared using 15 wt. % HCl in the absence of a retarder compound. A 10 mL sample of each acidizing retarder composition and the comparative example is then placed in a separate glass bottle and heated in an oven at 65° C. for 10 minutes. Each carbonate disc is weighed and then heated in the oven at 65° C. for 10 minutes. The carbonate disc is then dropped in each glass bottle and an acid-carbonate reaction initiates. After 20 minutes, each glass bottle is removed from the oven and the reaction is quenched by adding approximately 2 liters (L) of cold deionized (DI) water to each glass bottle. The solid unreacted calcium carbonate discs are removed from each bottle, dried, and weighed. The mass of each carbonate disc before the reaction (initial), the mass of each carbonate disc after reacting for 20 minutes, the mass loss, and the dissolution rate for each Example is reported in Table 1. As seen in Table 1, the addition of Poloxamer 407 in Examples 1-1, 1-2, and 1-3 results in a considerably slower carbonate dissolution rate in relation to Comparative Example 1, which does not comprise a retarder compound.

TABLE 1

| Example | Wt. % HCl | Wt. % retarder compound | Initial carbonate disc mass (g) | Carbonate disc mass after 20 min. (g) | Mass loss (g) | Dissolution rate (g/min) |
| --- | --- | --- | --- | --- | --- | --- |
| Comparative Example 1 | 15 | 0 | 3.85 | 1.4154 | 2.4346 | 0.1217 |
| Example 1-1 | 15 | 0.5 | 3.31 | 2.1803 | 1.1297 | 0.0565 |
| Example 1-2 | 15 | 1.0 | 3.29 | 2.1196 | 1.1704 | 0.0585 |
| Example 1-3 | 15 | 5.0 | 3.05 | 2.2463 | 0.8037 | 0.0402 |

Example 2. Reduced Carbonate Dissolution Using Acidizing Retarder Compositions at 85° C.

An acidizing retarder composition is prepared by dissolving a retarder compound in HCl according to Table 2, where the weight percent (wt. %) of HCl and the retarder compound is the wt. % of the prepared acidizing retarder composition before combining with the calcium carbonate disc, and the balance is water. Additionally, Comparative Example 2 is prepared using 15 wt. % HCl in the absence of a retarder compound. A 15 mL sample of the acidizing retarder composition and the comparative example is then placed in a separate glass bottle and heated in an oven at 85° C. for 10 minutes. Each carbonate disc is weighed and then heated in the oven at 85° C. for 10 minutes. The carbonate disc is then dropped in each glass bottle and an acid-carbonate reaction initiates. After 5 minutes, each glass bottle is removed from the oven and the reaction is quenched by adding approximately 2 L of cold DI water to each glass bottle. The solid unreacted calcium carbonate discs are removed from each bottle, dried, and weighed. The mass of each carbonate disc before the reaction (initial), the mass of each carbonate disc after reacting for 5 minutes, the mass loss, and the dissolution rate for each Example is reported in Table 2. As seen in Table 2, the addition of Poloxamer 407 in Example 2-1, results in a considerably slower carbonate dissolution rate in relation to Comparative Example 2, which does not comprise a retarder compound.

TABLE 2

| Example | Wt. % HCl | Wt. % retarder compound | Initial carbonate disc mass (g) | Carbonate disc mass after 5 min. (g) | Mass loss (g) | Dissolution rate (g/min) |
|---|---|---|---|---|---|---|
| Comparative Example 2 | 15 | 0 | 5.99 | 2.7496 | 3.2367 | 0.1618 |
| Example 2-1 | 15 | 1.0 | 5.21 | 4.5633 | 0.6475 | 0.0324 |

Example 3. Reduced Carbonate Dissolution Using Acidizing Retarder Compositions Comprising a Corrosion Inhibitor at 85° C.

An acidizing retarder composition is prepared by dissolving a retarder compound and a corrosion inhibitor in HCl according to Table 3, where the weight percent (wt. %) of HCl, the retarder compound, and the corrosion inhibitor is the wt. % relative to the weight of the prepared acidizing retarder composition before combining with the calcium carbonate disc, and the balance is water. Additionally, Comparative Example 3 is prepared using 15 wt. % HCl and 1 wt. % corrosion inhibitor in the absence of a retarder compound. The corrosion inhibitor used is BASFCorr from BASF. A 15 mL sample of the acidizing retarder composition and the comparative example is then placed in a separate glass bottle and heated in an oven at 85° C. for 10 minutes. Each carbonate disc is weighed and then heated in the oven at 85° C. for 10 minutes. The carbonate disc is then dropped in each glass bottle and an acid-carbonate reaction initiates. After 5 minutes, each glass bottle is removed from the oven and the reaction is quenched by adding approximately 2 L of cold DI water to each glass bottle. The solid unreacted calcium carbonate discs are removed from each bottle, dried, and weighed. The mass of each carbonate disc before the reaction (initial), the mass of each carbonate disc after reacting for 5 minutes, the mass loss, and the dissolution rate for each Example is reported in Table 3. As seen in Table 3, the addition of Poloxamer 407 in Example 3-1, which comprises a retarder compound and a corrosion inhibitor, results in a considerably slower carbonate dissolution rate in relation to Comparative Example 3, which comprises a corrosion inhibitor but does not comprise a retarder compound.

TABLE 3

| Example | Wt. % HCl | Wt. % retarder compound | Wt. % Corrosion inhibitor | Initial carbonate disc mass (g) | Carbonate disc mass after 5 min. (g) | Mass loss (g) | Dissolution rate (g/min) |
|---|---|---|---|---|---|---|---|
| Comparative Example 3 | 15 | 0 | 1.0 | 6.73 | 3.7045 | 3.0294 | 0.1515 |
| Example 3-1 | 15 | 1.0 | 1.0 | 5.08 | 4.5044 | 0.5735 | 0.0287 |

It will be apparent to persons of ordinary skill in the art that various modifications and variations can be made without departing from the scope disclosed herein. Since modifications, combinations, sub-combinations, and variations of the disclosed embodiments, which incorporate the spirit and substance disclosed herein, may occur to persons of ordinary skill in the art, the scope disclosed herein should be construed to include everything within the scope of the appended claims and their equivalents.

It is noted that one or more of the following claims utilize the term "where" or "in which" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising." For the purposes of defining the present technology, the transitional phrase "consisting of" may be introduced in the claims as a closed preamble term limiting the scope of the claims to the recited components or steps and any naturally occurring impurities. For the purposes of defining the present technology, the transitional phrase "consisting essentially of" may be introduced in the claims to limit the scope of one or more claims to the recited elements, components, materials, or method steps as well as any non-recited elements, components, materials, or method steps that do not materially affect the novel characteristics of the claimed subject matter. The transitional phrases "consisting of" and "consisting essentially of" may be interpreted to be subsets of the open-ended transitional phrases, such as "comprising" and "including," such that any use of an open ended phrase to introduce a recitation of a series of elements, components, materials, or steps should be interpreted to also disclose recitation of the series of elements, components, materials, or steps using the closed terms "consisting of" and "consisting essentially of." For example, the recitation of a composition "comprising" components A, B, and C should be interpreted as also disclosing a composition "consisting of" components A, B, and C as well as a composition "consisting essentially of" components A, B, and C. Any quantitative value expressed in the present application may be considered to include open-ended embodiments consistent with the transitional phrases "comprising" or "including" as well as closed or partially closed embodiments consistent with the transitional phrases "consisting of" and "consisting essentially of."

As used in the Specification and appended Claims, the singular forms "a", "an", and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced.

It should be understood that any two quantitative values assigned to a property may constitute a range of that property, and all combinations of ranges formed from all stated quantitative values of a given property are contemplated in this disclosure. The subject matter disclosed herein has been described in detail and by reference to specific embodiments. It should be understood that any detailed description of a component or feature of an embodiment does not necessarily imply that the component or feature is essential to the particular embodiment or to any other embodiment. Further, it should be apparent to those skilled in the art that various modifications and variations can be made to the described embodiments without departing from the spirit and scope of the claimed subject matter.

What is claimed is:

1. A method of reducing a rate of carbonate dissolution in a carbonate acidizing treatment of a carbonate formation, the method comprising:
   dissolving one or more retarder compounds in a solution comprising acid to form an acidizing retarder composition, wherein the acid consists of strong mineral acid, wherein at least one of the one or more retarder compounds comprises a poloxamer, and wherein the acidizing retarder composition comprises from 0.5 weight percent to 5 weight percent of the one or more retarder compounds based on the total weight of the acidizing retarder composition; and
   introducing the acidizing retarder composition to the carbonate formation, wherein the rate of carbonate dissolution in the presence of the acidizing retarder composition is reduced by an amount of from 50% to 95%, relative to a rate of carbonate dissolution in the absence of the acidizing retarder composition;
   wherein the poloxamer comprises a compound of formula (I):

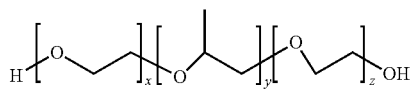

(I)

in which x and z are each independently an integer from 50 to 150; and
in which y is an integer from 20 to 80.

2. The method of claim 1, wherein x and z are each independently an integer from 95 to 105; and y is an integer from 50 to 60.

3. The method of claim 1, wherein the strong mineral acid comprises hydrochloric acid, nitric acid, sulfuric acid, hydrobromic acid, hydroiodic acid, triflic acid, perchloric acid, or a combination of two or more thereof.

4. The method of claim 1, wherein the acidizing retarder composition comprises greater than 5 weight percent of the acid based on the total weight of the acidizing retarder composition.

5. The method of claim 1, wherein the acidizing retarder composition further comprises one or more corrosion inhibitors.

6. The method of claim 5, wherein the acidizing retarder composition comprises from 0.01 weight percent to 5 weight percent of the one or more corrosion inhibitors based on a total weight of the acidizing retarder composition.

7. The method of claim 1, further comprising forming wormholes, conductive fractures, or combinations thereof, in the carbonate formation during a carbonate acidizing treatment.

8. The method of claim 1, wherein the carbonate formation is in a reservoir comprising hydrocarbons.

9. The method of claim 1, wherein the carbonate formation is in a reservoir comprising hydrocarbons, and the method further comprises extracting the hydrocarbons from the reservoir.

10. The method of claim 1, wherein the acidizing retarder composition does not comprise a corrosion inhibitor; or wherein the acidizing retarder composition comprises only one corrosion inhibitor.

11. The method of claim 1, wherein the acidizing retarder composition consists of water, the strong acid, the one or more retarder compounds, and one or more corrosion inhibitors.

12. The method of claim 1, wherein the solution consists of water and the acid.

13. The method of claim 1, wherein the acidizing retarder composition comprises from 1 weight percent to 5 weight percent of one or more corrosion inhibitors based on the total weight of the acidizing retarder composition.

14. A method of reducing a rate of carbonate dissolution in a carbonate acidizing treatment of a carbonate formation, the method comprising:
   dissolving one or more retarder compounds in a solution consisting of water and acid to form an acidizing retarder composition, wherein:
   the acid consists of strong mineral acid;
   at least one of the one or more retarder compounds comprises a poloxamer; and
   the acidizing retarder composition comprises from 0.5 weight percent to 5 weight percent of the one or more retarder compounds based on the total weight of the acidizing retarder composition; and
   introducing the acidizing retarder composition to the carbonate formation, wherein the rate of carbonate dissolution in the presence of the acidizing retarder composition is reduced by an amount of from 50% to 95%, relative to a rate of carbonate dissolution in the absence of the acidizing retarder composition;

wherein the poloxamer comprises a compound of formula (I):

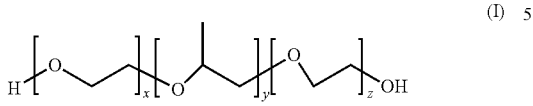 (I)

in which x and z are each independently an integer from 50 to 150; and
in which y is an integer from 20 to 80.

15. The method of claim 14, wherein x and z are each independently an integer from 95 to 105; and y is an integer from 50 to 60.

16. The method of claim 14, wherein one or more corrosion inhibitors are added to the acidizing retarder composition prior to introducing the acidizing retarder composition to the carbonate formation.

17. A method of reducing a rate of carbonate dissolution in a carbonate acidizing treatment of a carbonate formation, the method comprising:
dissolving one or more retarder compounds in a solution comprising acid to form an acidizing retarder composition, wherein:
the acid consists of strong mineral acid;
at least one of the one or more retarder compounds comprises a poloxamer;
the acidizing retarder composition comprises from 0.5 weight percent to 5 weight percent of one or more retarder compounds based on the total weight of the acidizing retarder composition; and
the acidizing retarder composition comprises from 1 weight percent to 5 weight percent of one or more corrosion inhibitors based on the total weight of the acidizing retarder composition; and
introducing the acidizing retarder composition to the carbonate formation, wherein the rate of carbonate dissolution in the presence of the acidizing retarder composition is reduced by an amount of from 50% to 95%, relative to a rate of carbonate dissolution in the absence of the acidizing retarder composition;
wherein the poloxamer comprises a compound of formula (I):

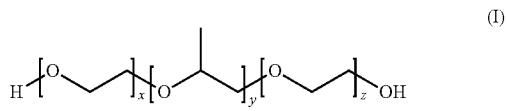 (I)

in which x and z are each independently an integer from 50 to 150; and
in which y is an integer from 20 to 80.

18. The method of claim 17, wherein x and z are each independently an integer from 95 to 105; and y is an integer from 50 to 60.

* * * * *